United States Patent [19]

Stroz et al.

[11] 4,241,090

[45] Dec. 23, 1980

[54] NON-ADHESIVE CHEWING GUMS AND METHOD

[75] Inventors: John J. Stroz, Monroe, Conn.; Abraham I. Bakal, Parsippany, N.J.; Donald A. M. Mackay, Pleasantville, N.Y.

[73] Assignee: Life Savers, Inc., New York, N.Y.

[21] Appl. No.: 971,756

[22] Filed: Dec. 21, 1978

[51] Int. Cl.² ............................................. A23G 3/30
[52] U.S. Cl. ......................................... 426/4; 426/658
[58] Field of Search ................................... 426/3, 4

[56] References Cited

U.S. PATENT DOCUMENTS

| | | | |
|---|---|---|---|
| 1,052,872 | 2/1913 | Williams | 426/5 |
| 1,977,059 | 10/1934 | Hatherell et al. | 426/4 |
| 2,286,712 | 6/1942 | Borglin | 426/6 |
| 2,438,551 | 3/1948 | Fenimore | 426/3 |
| 2,469,861 | 5/1949 | Cohoe | 426/3 |
| 2,489,147 | 11/1949 | Lougovoy | 426/3 |
| 2,586,675 | 2/1952 | Lutz | 426/3 |
| 2,876,106 | 3/1959 | Jucaitis | 426/3 |
| 3,255,018 | 6/1966 | Comollo | 426/3 |
| 3,795,744 | 3/1974 | Ogawa et al. | 426/3 |
| 3,814,815 | 6/1974 | Hashimoto | 426/3 |
| 3,974,293 | 8/1976 | Witzel | 426/4 |

*Primary Examiner*—Jeanette M. Hunter
*Attorney, Agent, or Firm*—Lawrence S. Levinson; Burton Rodney

[57] ABSTRACT

A non-adhesive chewing gum is provided which does not adhere to dentures and includes gum base, sweetener, flavor and a slip agent for imparting non-adhesive properties to the gum, the slip agent being alpha-cellulose, texturized vegetable protein, bran, fish protein concentrate, citrus peel, citrus pulp, fruit pulp or mixtures thereof. A method for imparting non-adhesive properties to chewing gum is also provided. The resulting chewing gum has significantly higher cud volume than previously known chewing gums of equivalent weight.

11 Claims, No Drawings

NON-ADHESIVE CHEWING GUMS AND METHOD

FIELD OF THE INVENTION

The present invention relates to a chewing gum composition which has a surprisingly large cud volume for its weight and which will not adhere to natural or artificial teeth or prosthetic devices.

BACKGROUND OF THE INVENTION

The interface between natural teeth and chewing gum is not one of tooth enamel (calcium phosphate) but rather mucin which is a slippery proteinaceous film covering natural teeth. However, it appears that artificial teeth and dentures, which are usually formed of acrylic polymers, polystyrene, polyvinyl chloride, polyvinyl esters (Luxene), hard rubber (Vulcanite), and the like, do not wet as effectively as natural teeth, and will not readily be coated with mucin. Accordingly, where many chewing gum compositions will not adhere to natural teeth, they will adhere to artificial teeth and dentures.

Various additives for chewing gums have been suggested to reduce or eliminate the problem of chewing gum adhering to dentures and artificial teeth, such as lecithin as disclosed in U.S. Pat. Nos. 2,197,719, lanolin as disclosed in U.S. Pat. No. 2,197,718 and silicone oils as disclosed in U.S. Pat. No. 2,761,782. U.S. Pat. No. 3,255,018 to Comollo discloses the use of water-soluble hydrolyzable tannin, such as tannic acid or polymer-tannic acid adducts, in combination with type A or B gelatin water-containing hydrophilic polymer gels.

U.S. Pat. No. 1,977,059 to Hatherell discloses a method of making a chewing gum base produced from resin, rubber, and other materials examples of which include fine fibers of a material such as wood or asbestos or cotton or silk. The latter materials are ostensibly present to impart cohesivity to the gum base.

Larger cud volume is a desired characteristic in chewing gums, since after the extractable materials are consumed during chewing larger volume of the leftover cud results in better and easier chew. This is especially true in bubble gum, since small cuds will not allow blowing bubbles. Accordingly, increasing the cud volume without increasing the gum base is a very desired characteristic in chewing gums.

DESCRIPTION OF THE INVENTION

In accordance with the present invention, a chewing gum composition is provided which will not adhere to natural teeth, artificial teeth, filling material, and dental prosthetic devices. The chewing gum of the invention contains gum base, one or more sweeteners, flavors and wetting agents or lubricants, and from about 1 to about 15%, preferably from about 3 to about 15%, and more preferably from about 2 to about 8% by weight (based on the total weight of the chewing gum) of a slip agent for imparting to and enhancing slip release qualities of the chewing gum so that it will not adhere to denture material, artificial teeth or filling materials.

The slip agent may comprise alpha-cellulose, texturized vegetable protein, fish protein concentrate, bran, citrus peel, cellulose, pectin, citrus pulp, other fruit pulp or mixtures thereof. The slip agent will preferably be in particulate form having a particle size ranging from about 500 to about 30 microns, and more preferably from about 150 to about 30 microns.

The chewing gum of the invention optionally includes one or more thickeners, and from about 0 to about 30% and preferably from about 3% to about 20% by weight water.

In addition, a method is provided for imparting non-adhesive properties to chewing gum wherein a slip agent as defined above is added to the ingredients making up the chewing gum.

It has also been surprisingly found that the addition of the slip agent to the chewing gum described herein in the amounts described above increases the cud volume of the chewing gum from about 5 to about 15% over the same chewing gum without such slip agent. In addition, the presence in the gum of water in an amount ranging from about 1 to about 15% by weight, and preferably from about 2 to about 5% by weight, and/or a thickener, such as carboxymethyl cellulose in an amount within the range of from about 0 to about 3% by weight, and preferably from about 0.2 to about 1.5% by weight (the water and/or thickener being present in addition to the slip agent), causes the cud volume of the chewing gum to increase from about 8 to about 18% or more over the cud volume of the same chewing gum without the slip agent and water and/or thickener.

The chewing gum of the invention will preferably include a plasticizer or aqueous softener, such as a polyhydric alcohol in liquid form (xylitol syrup, sorbitol syrup, maltitol syrup or hydrogenated starch hydrolysates such as disclosed in U.S. Pat. No. Re. 26,959 and U.S. Pat. No. 3,556,811), as well as modified starch syrup and/or corn syrup.

The aqueous softener (or binder) will contain from about 65 to about 80% and preferably from about 70 to about 75% by weight solids and will be present in an amount from about 3 to about 30% and preferably from about 5 to about 25% by weight of the chewing gum depending upon the type and amount of sweetener solids present in the softener.

Thickeners which may be employed herein alone or in conjunction with the aqueous softener include hydrolyzed cereal solids, malto-dextrin, modified food starch, low D.E. corn syrup solids, alginates, carrageenan, xanthan gum, gelatin, carob, tragacanth, locust bean, and other water-soluble gums, and carboxymethyl cellulose, with malto-dextrin and carboxymethyl cellulose being particularly preferred.

The chewing gum of the invention will contain one or more natural and/or artificial sweeteners. Example sweeteners which may be employed herein include, but are not limited to, one or more of the following: natural sweeteners, such as monosaccharides, such as arabinose, xylose, ribose, glucose, mannose, galactose, fructose, fructose syrup, dextrose, or sorbose or mixtures of two or more of the foregoing monosaccharides; disaccharides, such as sucrose, for example, cane or beet sugar, lactose, maltose or cellobiose; and polysaccharides, glycyrrhizin, molasses, caramel, monoammonium salt of glycyrrhizin, mono-, di- or tri-sodium salt of glycyrrhizin, mono-, di- or tri-potassium salt of glycyrrhizin, and calcium salt of glycyrrhizin; sugar alcohols, such as mannitol, sorbitol, xylitol, maltitol; artificial sweenteners, such as calcium saccharin, sodium saccharin, free acid form of saccharin, ammonium saccharin, aspartame (L-aspartyl-L-phenylalanine methyl ester), naringin dihydrochalcone, neohesperidin dihydrochalcone, cyclamic acid, sodium cyclamate, calcium cyclamate,

*Dioscoreophyllum cumminsii* (Serendipity Berry), *Stevia rebaudiana* (Stevioside), *Richardella dulcifica* (Miracle Berry), or thaumatin, with sucrose, a saccharin and/or sorbitol being preferred.

In general, the gum base is prepared by heating and blending natural gums, synthetic resins, waxes, plasticizers, etc., in a manner well known in the art. Typical examples of the ingredients found in a chewing gum base are masticatory substances of synthetic origin such as styrene-butadiene copolymer, isobutyleneisoprene copolymer, polyisobutylene, polyethylene, petroleum wax, polyvinyl acetate, as well as masticatory substances of natural origin such as rubber latex solids, chicle, crown gum, nispero, rosidinha, jelutong, pendare, perillo, niger gutta, tunu, etc. The elastomer or masticatory substance will be employed in an amount within the range of about 5 to about 15%, preferably from about 8 to about 12%, and optimally from about 9 to about 11% by weight of the gum base composition.

In addition, the gum base will preferably contain a solvent for the elastomer which should have minimal tackifying properties and will preferably comprise hydrogenated ester gum, that is, glycerol ester of hydrogenated rosin and/or dimerized ester gum.

Other conventional ingredients which may be present in the gum base include a hydrophilic-type detackifier which will sorb saliva and become slippery and is incompatible with the elastomer and solvent for the elastomer, such as polyvinyl acetate, polyvinyl butyl ether, copolymers of vinyl esters and vinyl ethers.

The gum base may also include hard waxes which serve as lubricants and should have a melting point of above about 65° C. and preferably above about 75° C. Examples of such hard waxes include candelilla wax, paraffin wax, carnauba wax, ozokerite, oricury, microcrystalline wax, and the like.

The gum base may also include a softening agent and lubricant combination which may comprise one or more hydrogenated vegetable or animal fats having a high melting point, that is above about 22° C.

The gum base will also include an emulsifier to impart hydrophilic properties to the gum base so that saliva will be absorbed, thereby making the gum base slippery. Examples of such emulsifiers include glyceryl monostearate, phosphatides, such as lecithin and cephalin, Tweens, Spans and mixtures thereof.

In addition, the gum base may include colorants such as titanium dioxide, plasticizers, such as lanolin, stearic acid, sodium stearate, potassium stearate and the like, antioxidants, in an amount up to about 1000 ppm of the gum base, such as butylated hydroxytoluene, butylated hydroxyanisole, and/or propyl gallate.

The gum base may also contain particles of chalk ($CaCO_3$) as a bulking agent and texturizer in amounts ranging from about 0 to about 75%, and preferably from about 0.2 to about 25% by weight of the gum base. However, where the gum base is to be employed in a substantially calorie-free gum, the gum base may include from about 32 to about 75% and preferably from about 35 to about 70% by weight texturizing agent or inert filler. Examples of texturizing agents or inert fillers suitable for use herein include calcium carbonate, aluminum hydroxide, alumina, magnesium carbonate, talc, aluminum silicates and mixtures thereof. In addition, the gum base may be mixed with artificial sweeteners and/or food acids as set out herein to provide initial burst of sweetness or sourness and/or prolongation of sweetness.

The water-insoluble gum base may consist of any of the various bases disclosed for example in U.S. Pat. Nos. 3,052,552 and 2,197,719.

The chewing gum of the invention may include flavoring, such as sour or fruit flavoring or non-acid or mint flavoring in an amount ranging from about 0.3 to about 2.0% by weight, and preferably from about 0.5 to about 1.2% by weight of the final gum product. The flavoring may comprise oils derived from plants, leaves, flowers, fruit, etc. Representative flavor oils of this type include citrus oils such as lemon oil, orange oil, lime oil, grapefruit oil, fruit essences such as apple essence, pear essence, peach essence, strawberry essence, apricot essence, raspberry essence, cherry essence, plum essence, pineapple essence, as well as the following essential oils: peppermint oil, spearmint oil, mixtures of peppermint oil and spearmint oil, clove oil, bay oil, anise oil, eucalyptus oil, thyme oil, cedar leaf oil, cinnamon oil, oil of nutmeg, oil of sage, oil of bitter almonds, cassia oil, and methylsalicylate (oil of wintergreen). Various synthetic flavors, such as mixed fruit, may also be incorporated in the chewing gum of the invention with or without conventional preservatives. The above flavors may be added with the aqueous softener to the gum base.

In order to provide an initial taste or sensation of sourness, the chewing gum of the invention may also contain food acid such as citric acid, tartaric acid, malic acid, and the like, in an amount ranging from about 0.3 to about 2.0% by weight, and preferably from about 0.5 to about 1.2% by weight of the final gum product. Such food acid may be added to the gum with the aqueous softener, in order to facilitate initial sourness. In addition, insoluble acids such as fumaric or encapsulated soluble acids may be added and buried in the gum base in order to sustain lasting sourness.

The method for forming the chewing gum of the invention includes the steps of mixing melted gum base with flavoring and slip agent, and preferably with softener or emulsifier, such as lecithin. Bulking agent or plasticizer, such as corn syrup, modified starch syrup, and/or sorbitol syrup or other conventional syrupy bulking agents, and one or more sweeteners and thickeners are added with mixing. The mixture is cooled to form a chewing gum which is rolled and scored and cut into strips.

The following represents preferred formulations of chewing gum in accordance with the present invention.

|  | Range Parts by Weight of Chewing Gum | |
|---|---|---|
|  | Sugar Based | Sugarless Gum |
| Gum Base | 10–35 | 10–35 |
| Sugar | 40–60 | — |
| Corn Syrup | 12–20 | — |
| Sorbitol Solids | — | 40–60 |
| Sorbitol Syrup | — | 12–20 |
| Mannitol | — | 0–25 |
| Flavor Oil | 0.5–1.2 | 0.5–1.2 |
| Spray Dried Flavor | 0.3–0.8 | 0.3–0.8 |
| Lecithin | 0.1–0.5 | 0.1–0.5 |
| Slip Agent | 2–8 | 2–8 |
| Water Added | 0–15 | 0–15 |
| Thickener | 0–1.5 | 0–1.5 |
| Other Sweetener: Artificial | 0–0.5 | 0–0.5 |

-continued

|  | Range Parts by Weight of Chewing Gum | |
|---|---|---|
|  | Sugar Based | Sugarless Gum |
| Natural | 0-60 | 0-60 |

EXAMPLES 1 TO 9

Chewing gums are prepared according to the basic compositions given in Table I. The chewing gums are prepared by melting the gum base followed by cooling to between 180° F. and 170° F. To the gum base, the lecithin and the corn syrup are added and mixed. Sugar is added to the mix, mixed for 3 minutes, followed by the addition of the flavor oil and spray dried flavor and 3 minutes mixing. To this chewing gum, the other ingredients are added either as dry powder (if no water is used) or as a slurry (in case water is added). The mass is mixed for 5 minutes, and the product is removed from the kettle, rolled and scored.

TABLE I

| Ingredient | Control | 1 | 2 | 3 | 4 | 5 | 6 | 7 | 8[1] | 9 |
|---|---|---|---|---|---|---|---|---|---|---|
| Gum Base 6AY | 21.6 | 21.6 | 21.6 | 21.6 | 21.6 | 21.6 | 21.6 | 21.6 | 21.6 | 21.6 |
| Sugar | 59.7 | 47.1 | 44.1 | 57.7 | 54.7 | 47.7 | 49.1 | 44.7 | 49.7 | 59.1 |
| Corn Syrup | 17.0 | 17.0 | 17.0 | 17.0 | 17.0 | 17.0 | 17.0 | 17.0 | 17.0 | 17.0 |
| Peppermint Flavor Oil | 1.0 | 1.0 | 1.0 | 1.0 | 1.0 | 1.0 | 1.0 | 1.0 | 1.0 | 1.0 |
| Spearmint Spray-Dried Flavor | 0.5 | 0.5 | 0.5 | 0.5 | 0.5 | 0.5 | 0.5 | 0.5 | 0.5 | 0.5 |
| Lecithin | 0.2 | 0.2 | 0.2 | 0.2 | 0.2 | 0.2 | 0.2 | 0.2 | 0.2 | 0.2 |
| Wood Pulp[2] | — | 2.0 | 5.0 | 2.0 | 5.0 | 2.0 | — | 5.0 | — | — |
| Water | — | 10.0 | 10.0 | — | — | 10.0 | 10.0 | 10.0 | 10.0 | — |
| CMC | — | 0.6 | 0.6 | — | — | — | 0.6 | — | — | 0.6 |

[1]Gum preparation is not completed since the addition of water results in a very soft gum
[2]α-cellulose sold as KEYCEL and obtained from Fiber Sales Development Corporation. KEYCEL is powdered cellulose prepared by processing α-cellulose obtained as a pulp from fibrous plant materials. The sample used has an average particle size of 59μ.

TABLE II

| Example No.[1] | Ingredients Evaluated | Cud Volume (cc) | Percent[2] Change |
|---|---|---|---|
| Control | — | 1.08 | — |
| 1 | 2% Wood Pulp 10% Water 0.6% CMC | 1.17 | 8.3 |
| 2 | 5% Wood Pulp 10% Water 0.6% CMC | 1.22 | 13.0 |
| 3 | 2% Wood Pulp | 1.14 | 5.6 |
| 4 | 5% Wood Pulp | 1.18 | 10.2 |
| 5 | 2% Wood Pulp 10% Water | 1.19 | 10.2 |
| 9 | 0.6% CMC | 1.17 | 8.3 |
| Commercial Gums | — | 0.87 | — |

[1]See Table I for detailed composition
[2]Percent increase in cud volume versus control

TABLE III

| Example No.[1] | Ingredients Evaluated | Sticking Force (grams) | Percent[2] Change |
|---|---|---|---|
| Control | — | 44.6 | — |
| 1 | 2% Wood Pulp 10% Water 0.6% CMC | 16.5 | 63.0 |
| 2 | 5% Wood Pulp 10% Water 0.6% CMC | 12.9 | 71.1 |
| 3 | 2% Wood Pulp | 14.7 | 67.0 |
| 4 | 5% Wood Pulp | 16.0 | 64.1 |
| 5 | 2% Wood Pulp 10% Water | 17.2 | 61.4 |
| 6 | 10% Water 0.6% CMC | 25.6 | 42.6 |
| 7 | 5% Wood Pulp 10% Water | 15.7 | 64.8 |
| 9 | 0.6% CMC | 27.9 | 37.4 |
| Commercial Gum "Freedent" | — | 89.1 28.4 | |

[1]See Table I for detailed composition
[2]Percent decrease in sticking force versus control Samples of chewing gums are chewed for five minutes, and the cuds are collected and evaluated for:
Cud volume
Sticking properties to denture surfaces.

(1) Cud Volume Determination

Cud volume is measured after dipping the cud in alcohol to effect surface drying. The cud is weighed in air and in water, and the differences in weight divided by the density of water is reported as the cud volume in cubic centimeters (cc).

(2) Sticking Properties to Denture Surfaces

The sticking properties of the cud is determined using the Instron. The force required to pull the cud from the denture surface is measured and is reported in grams.

The cud volume of the various chewing gum compositions evaluated is given in Table II. These data indicate an increase in the cud volume of about 8 to 13%, with the highest increase attributed to the addition of water, CMC and wood pulp. The addition of wood pulp at the 2 and 5% level results in an increase of 5.6 to 10.2%, respectively, over control samples.

The effect of wood pulp addition on the sticking properties of the gum to denture surfaces is summarized in Table III. Data indicate that the addition of 2% and 5% wood pulp to the chewing gum results in a significant decrease in the sticking of the cud to denture surfaces. Furthermore, the non-stick properties of this gum is significantly lower than that of the commercially available non-stick chewing gum, "Freedent." Data also indicate that substituting wood pulp with CMC results in a much smaller reduction in the sticking force as compared to wood pulp.

What is claimed is:

1. A chewing gum having non-adhesive properties comprising gum base, sweetener, flavoring and from about 1 to about 15% by weight of alpha-cellulose a non-adhesive-imparting slip agent to improve chewing quality, impart non-adhesive properties to said gum and increase cud size of said gum, said chewing gum further including from 1 to about 30% by weight water, and from 0.2 to about 3% by weight of a thickener, said thickener being hydrolyzed cereal solids, malto-dextrin, modified food starch, low D.E. corn syrup solids, alginates, carrageenan, xanthan gum, gelatin, carob, tragacanth, locust bean, and other water-soluble gums, or carboxymethyl cellulose.

2. The chewing gum as defined in claim 1 wherein said alpha-cellulose is in particulate form having an average particle size within the range of from about 500 to about 30 microns.

3. The chewing gum as defined in claim 1 wherein said thickener comprises carboxymethyl cellulose.

4. The chewing gum as defined in claim 1 wherein said chewing gum contains from about 0.2 to about 1.5% by weight of a thickener.

5. The chewing gum as defined in claim 1 wherein said chewing gum contains from about 1 to about 15% by weight water.

6. The chewing gum as defined in claim 1 wherein said chewing gum contains from about 1 to about 15% by weight water, and from about 0.2 to about 3% by weight carboxymethyl cellulose.

7. The chewing gum as defined in claim 1 wherein said sweetener is a sugar, sugar alcohol or mixture thereof.

8. The chewing gum as defined in claim 1 wherein said sweetener is an artificial sweetener or sugar alcohol or mixture thereof.

9. The chewing gum as defined in claim 1 further including xylitol syrup, sorbitol syrup, maltitol syrup, hydrogenated starch hydrolysate, modified starch syrup, corn syrup or mixtures thereof.

10. A method for imparting non-adhesive properties while increasing cud volume of chewing gum said chewing gum comprising gum base, sweetener and flavor, which comprises adding to said chewing gum ingredients from about 1 to about 15% by weight of a slip agent comprising alpha-cellulose and further adding to said chewing gum ingredients from about 1 to about 15% by weight water, and from about 0.2 to about 3% by weight of a thickener.

11. The method as defined in claim 10 wherein said thickener comprises from about 0.2 to about 1.5% by weight carboxymethyl cellulose, said % being based on the total weight of said chewing gum.

* * * * *